(12) United States Patent
Lun et al.

(10) Patent No.: US 7,487,507 B1
(45) Date of Patent: Feb. 3, 2009

(54) SECURE CONTROL TRANSFER IN INFORMATION SYSTEM

(75) Inventors: Mok Pak Lun, Hong Kong (HK); Anthony Shi Sheung Fong, Hong Kong (HK)

(73) Assignee: City U Research Limited, Kowloon (HK)

( * ) Notice: Subject to any disclaimer, the term of this patent is extended or adjusted under 35 U.S.C. 154(b) by 1141 days.

(21) Appl. No.: 10/236,015

(22) Filed: Sep. 4, 2002

Related U.S. Application Data

(63) Continuation-in-part of application No. 10/198,617, filed on Jul. 17, 2002, now abandoned.

(60) Provisional application No. 60/306,480, filed on Jul. 18, 2001.

(51) Int. Cl.
*G06F 9/46* (2006.01)
*G06F 9/44* (2006.01)

(52) U.S. Cl. .................. 718/108; 719/315; 717/140; 717/158

(58) Field of Classification Search .................. 718/1, 718/100–108; 719/315; 717/140, 158
See application file for complete search history.

(56) References Cited

U.S. PATENT DOCUMENTS

| 5,930,829 | A | | 7/1999 | Little |
| 5,946,487 | A | * | 8/1999 | Dangelo ................ 717/148 |
| 6,003,038 | A | * | 12/1999 | Chen ................ 707/103 R |
| 6,219,772 | B1 | | 4/2001 | Gadangi et al. |
| 6,292,879 | B1 | | 9/2001 | Fong |
| 6,295,594 | B1 | | 9/2001 | Meier |

(Continued)

FOREIGN PATENT DOCUMENTS

WO WO 99/35548 7/1999

(Continued)

OTHER PUBLICATIONS

Donzellini, Guiliano et al. "Object Oriented ARM7 Coprocessor." IEEE. 1998.*

(Continued)

*Primary Examiner*—Meng-Ai An
*Assistant Examiner*—Jennifer N To
(74) *Attorney, Agent, or Firm*—Quine Intellectual Property Law Group; Stephen J. Le Blanc

(57) ABSTRACT

Methods and/or systems and/or apparatus for improved security in information processing systems provide secure control transfer and object-oriented programming support at an architectural level using hardware readable data structures that represent different object structures in order to securely switch context. An architectural level Object-Oriented Programming (OOP) processor allows OOP software to be directly mapped into hardware and object security can be enforced not only in software, but also in hardware. The processor performs security checks for objects and eliminates most of the software work for access checking. In some embodiments, a hardware or hardware-like (e.g., firmware) device is used for communication and access control, to compute instructions, with a mapping mechanism of access control for object-oriented computing, through operand descriptor tables to describe the access control based on the object-orientation requirements, such as private, public, package, or protected, etc. The hardware emulates an object-orientation environment, to provide object management, object-oriented memory management, etc.

13 Claims, 10 Drawing Sheets

| Invoke Type | Context | | |
|---|---|---|---|
| | Instance | Class | Method |
| Internal Method | | | ☐ |
| Class Method | | ☐ | ☐ |
| Instance Method | ☐ | ☐ | ☐ |

(Note: An '☐' means a switch in context)

*CONTEXT INVOLVED IN METHOD INVOCATION*

U.S. PATENT DOCUMENTS

| | | | | |
|---|---|---|---|---|
| 6,567,837 | B1 * | 5/2003 | Robinson | 718/1 |
| 6,615,279 | B1 * | 9/2003 | Robinson | 719/315 |
| 6,684,261 | B1 * | 1/2004 | Orton et al. | 719/328 |
| 2002/0100029 | A1 * | 7/2002 | Bowen | 717/140 |
| 2003/0140337 | A1 * | 7/2003 | Aubury | 717/158 |

FOREIGN PATENT DOCUMENTS

WO      WO 02/48864 A2     6/2002

OTHER PUBLICATIONS

Avotins, Jon et al. "Yes! An Object-Oriented Compiler Compiler (YOOCC)." Citeseer. 1995.*

Adl-Tabatabai et al. (1998) "Fast, effective code generation in a just-in-time Java compiler", in Proceedings of the ACM SIGPLAN 1998 conference on Programming language design and implementation, pp. 280-290, 1998.

Burke et al.(1999) "The Jalapeño dynamic optimizing compiler for Java", in ACM 1999 Java Grande Conference, pp. 129-141, Jun. 1999.

Calder et al. (1995) "Quantifying Behavioral Differences Between C and C++ Programs," Technical Report CU-CS-698-95, Department of Computer Science, University of Colorado, Boulder, CO, Jan. 1995.

Cam et al. (1999) "A high-performance hardware-efficient memory allocation technique and design". *International Conference on Computer Design*, 1999. (ICCD '99), pp. 274-276. IEEE Computer Society Press, Oct. 1999.

Chang and Gehringer (1996) "A high performance memory allocator for object-oriented systems". *IEEE Transactions on Computers*, vol. 45, issue 3, pp. 357-366. IEEE Computer Society Press, Mar. 1996.

Chang et al. (1999) "Measuring dynamic memory invocations in object-oriented programs". *IEEE International Computing and Communications Conference Performance* 1999, pp. 268-274. IEEE Computer Society Press, Feb. 1999.

Chiueh et al. (1999) "Integrating segmentation and paging protection for safe, efficient and transparent software extensions", in Proceedings of the 17th ACM Symposium on Operating Systems Principles, pp. 140-153, 1999.

Detlefs et al. (1994) "Memory allocation costs in large C and C++ programs.". *Software—Practice and Experience*, pp. 527-542, Jun. 1994.

Jacob and Mudge (1998) "Virtual Memory in Contemporary Microprocessors", IEEE Micro, Aug. 1998.

Li et al. (2001) "Dynamic Memory Allocation Behavior in Java Programs". *Proceedings of the ISCA 16th International Conference in Computers and Their Applications*, 2001. (CATA-2001), pp. 362-365. The International Society for Computers and Their Applications—ISCA.

McGhan and O'Connor (1998) "Picojava: A Direct Execution Engine for Java Bytecode", Computer, 31(10), pp. 22-30, Oct. 1998.

Radhakrishnan et al. (2001) "Improving Java performance using hardware translation", International Conference on Supercomputing, pp. 427-439, 2001.

Radhakrishnan et al. (2001) "Java Runtime Systems: Characterization and Architectural Implications", IEEE Transactions on Computers, 50(2), pp. 131-146, Feb. 2001.

Shapiro et al. (1999) "EROS: A Fast Capability System", in 17th ACM Symposium on Operating System Principles (SOSP'99), Charleston, USA, Dec. 1999.

Sun Microsystems, Inc. (2001), "Java HotSpot Virtual Machine: Technical White Paper", located on the World Wide Web at http://www.javasoft.com/products/hotspot.

Vijaykrishnan et al. (1998) "Object-Oriented Architectural Support for a Java Processor", in Proceedings of ECOOP'98, the 12th European Conference on Object-Oriented Programming, pp. 430-455, 1998.

* cited by examiner

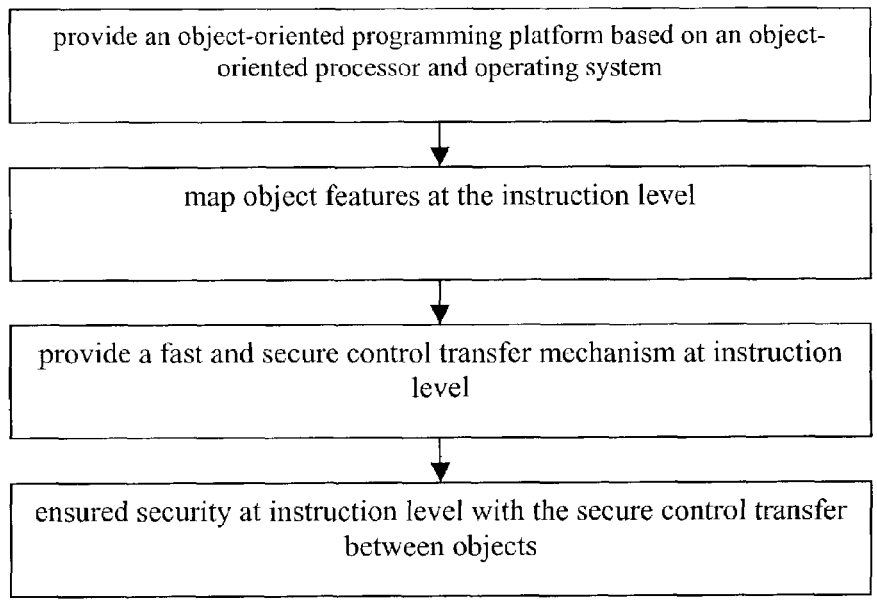
FIGURE 1. A METHOD FOR IMPROVED SECURITY AND ENHANCED PERFORMANCE
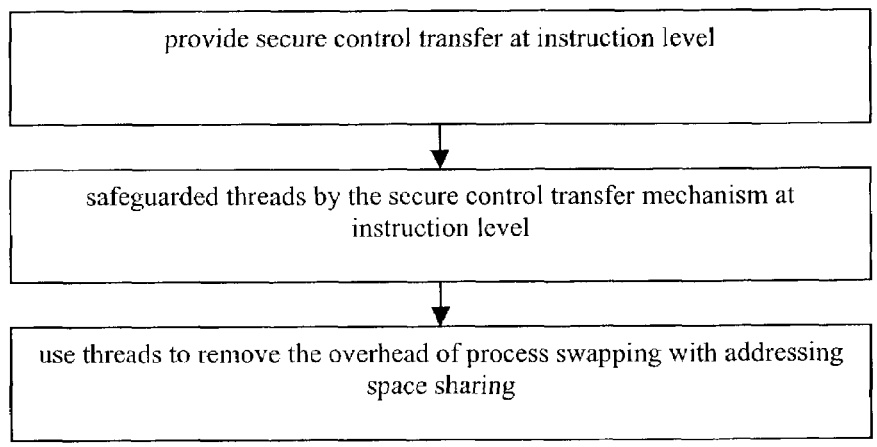
FIGURE 2. A METHOD FOR ENHANCED PERFORMANCE IN MULTI-TASKING ENVIRONMENT

| Invoke Type | Context | | |
|---|---|---|---|
| | Instance | Class | Method |
| Internal Method | | | ☐ |
| Class Method | | ☐ | ☐ |
| Instance Method | ☐ | ☐ | ☐ |

(Note: An '☐' means a switch in context)

_FIGURE 3. CONTEXT INVOLVED IN METHOD INVOCATION_

| Bits | Method States |
|---|---|
| 00 | Internal Method Invocation |
| 01 | Class Method Invocation |
| 10 | Instance Method Invocation |
| 11 | Reserved |

_FIGURE 4. DEFINITION OF METHOD STATES IN STATUS REGISTER_

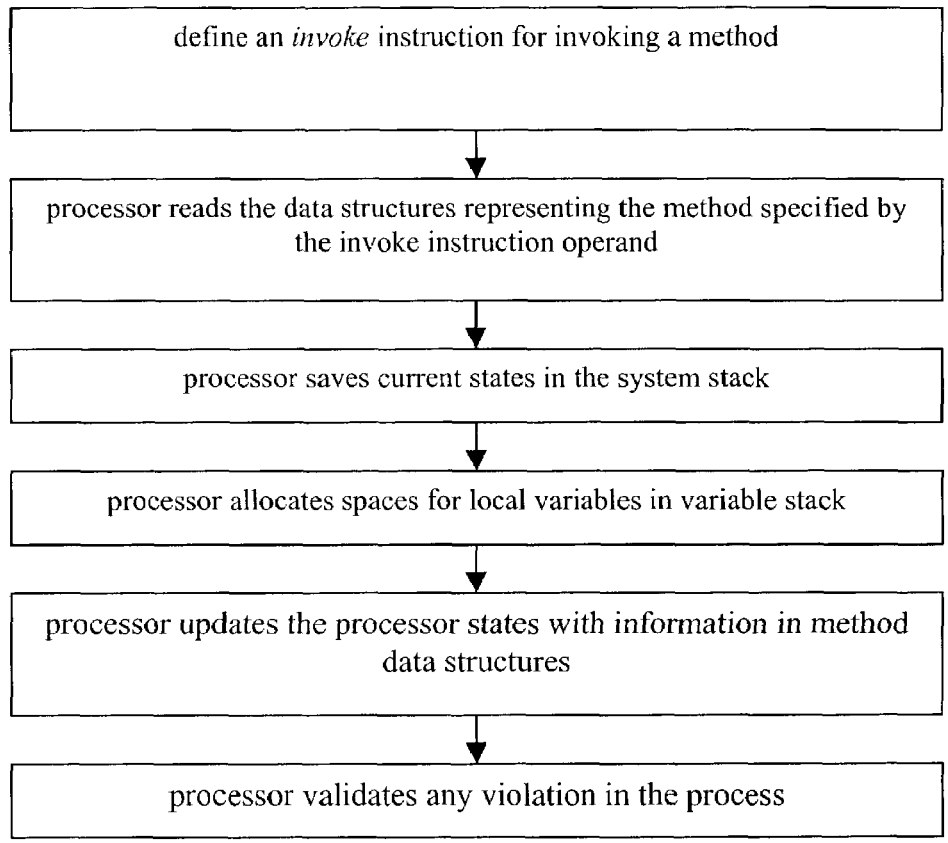
FIGURE 5. MAJOR STEPS FOR METHOD INVOCATION
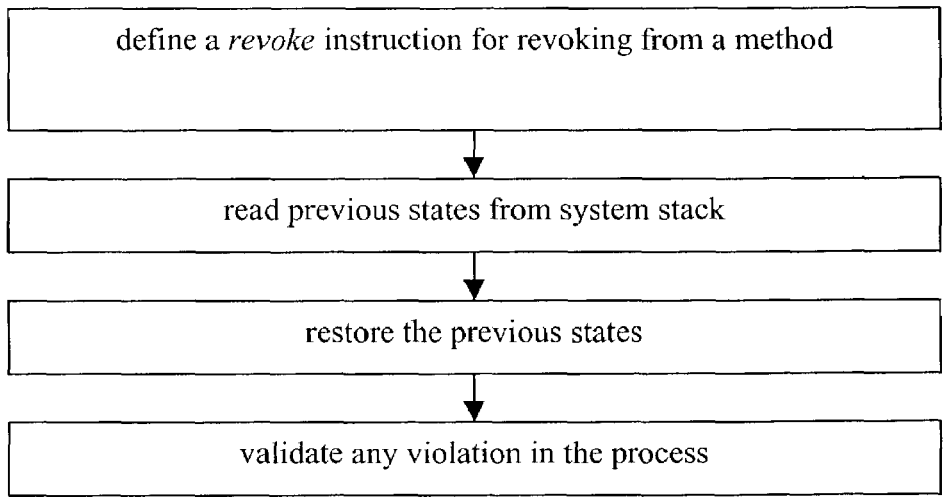
FIGURE 6. MAJOR STEPS FOR METHOD REVOCATION

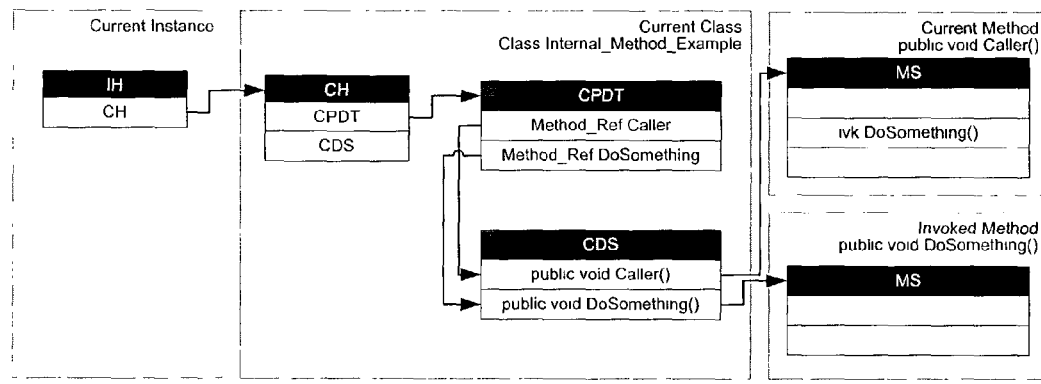
FIGURE 7. INTERNAL METHOD INVOCATION EXAMPLE IN JAVA AND ITS CORRESPONDING DATA STRUCTURE IN THE SYSTEM

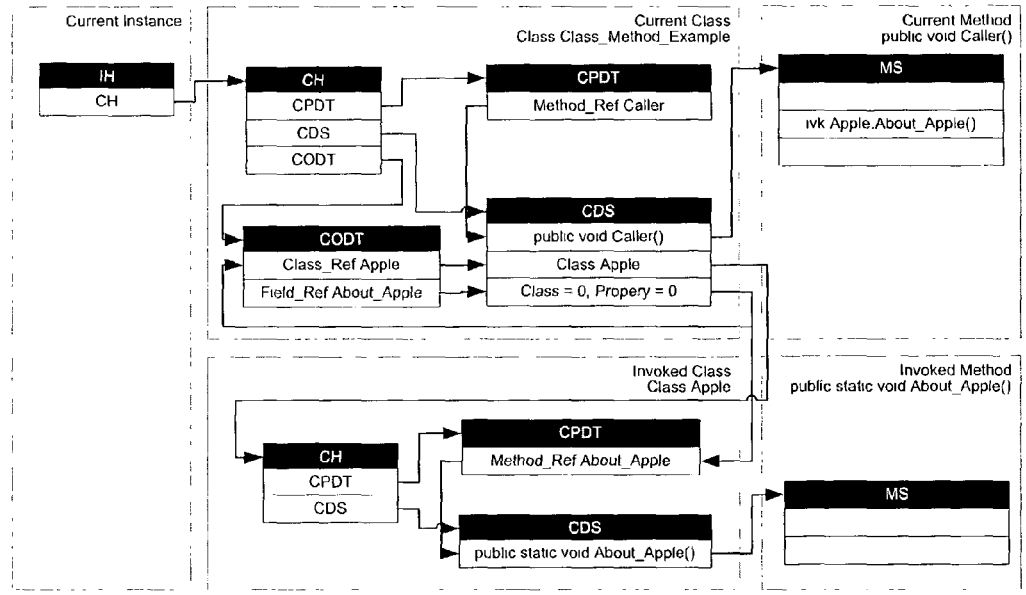
FIGURE 8. CLASS METHOD INVOCATION EXAMPLE IN JAVA AND ITS CORRESPONDING DATA STRUCTURE IN THE SYSTEM

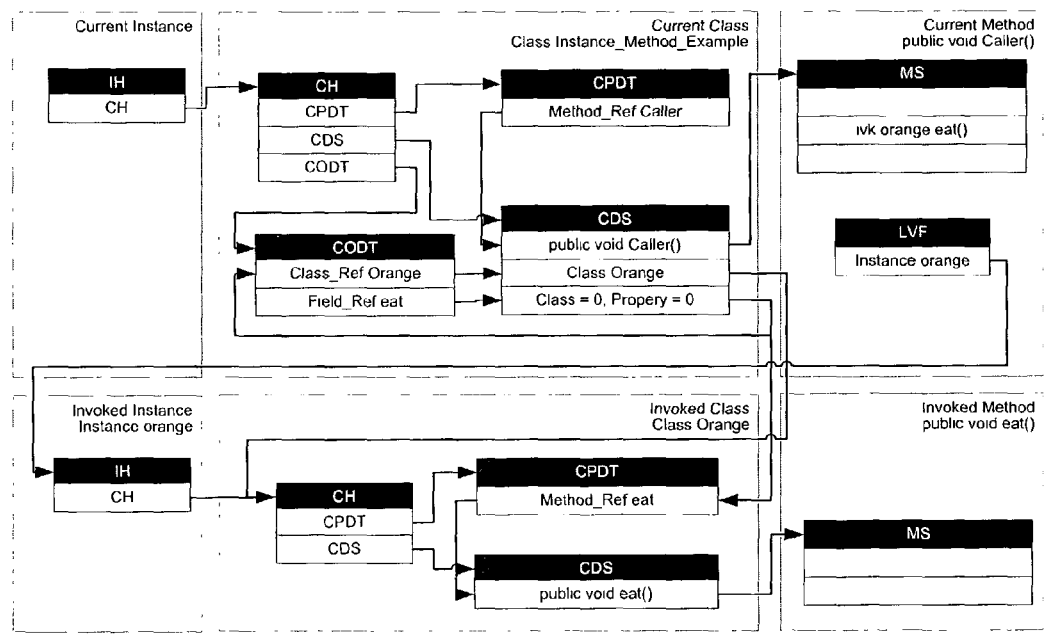
FIGURE 9. INSTANCE METHOD INVOCATION EXAMPLE IN JAVA AND ITS CORRESPONDING DATA STRUCTURE IN THE SYSTEM
| Address | Type | Resolved Flag |
|---------|------|---------------|
| 24 | 4 | 1 |
FIGURE 10. THE CLASS OPERAND DESCRIPTOR FORMAT
| Address | Type | Static Flag | Read Only Flag |
|---------|------|-------------|----------------|
| 24 | 4 | 2 | 1 |
FIGURE 11. THE CLASS PROPERTY DESCRIPTOR FORMAT

| Value | Type |
|---|---|
| 0 | Reserved |
| 1 | Byte |
| 2 | Halfword |
| 3 | Word |
| 4 | Doubleword |
| 5 | Float |
| 6 | Double |
| 7 | Array Reference |
| 8 | Instance Reference |
| 9 | Method Reference |
| A | Class Reference |
| B | Property Reference |
| C-F | Reserved |

*FIGURE 12. THE TYPE FIELD DEFINITION*

| Bit | Definition |
|---|---|
| 00 | Non-static Field |
| 01 | reserved |
| 10 | Static Field |
| 11 | Inherited Static Field |

*FIGURE 13. THE STATIC FLAG DEFINITION*

| Bit | Definition |
|---|---|
| 0 | Read and Write |
| 1 | Read Only |

*FIGURE 14. THE READ ONLY FLAG DEFINITION*

| Bit | Definition |
|---|---|
| 0 | Unresolved |
| 1 | Resolved |

*FIGURE 15. THE RESOLVED FLAG DEFINITION*

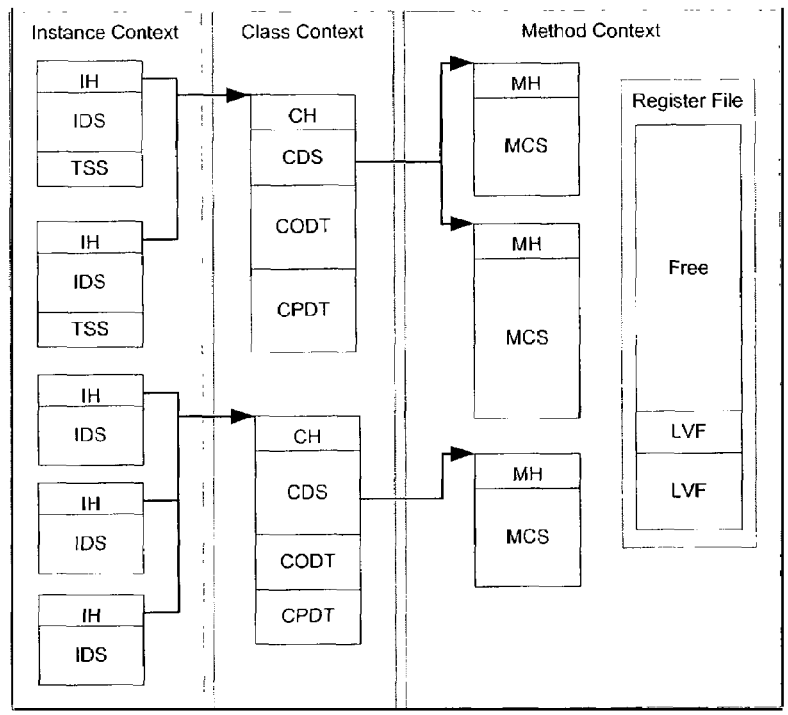
FIGURE 16. DATA STRUCTURE RELATIONSHIP
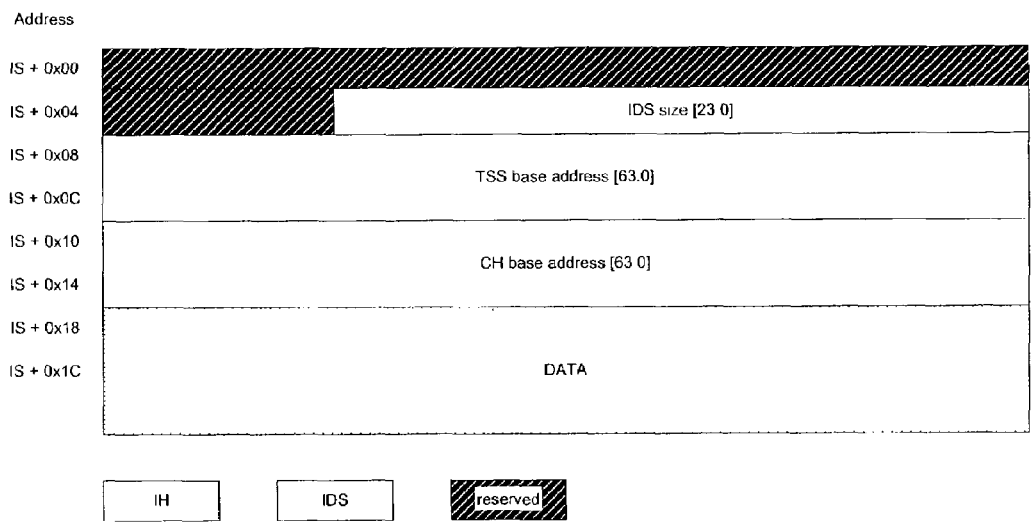
FIGURE 17. INSTANCE SPACE (IS)

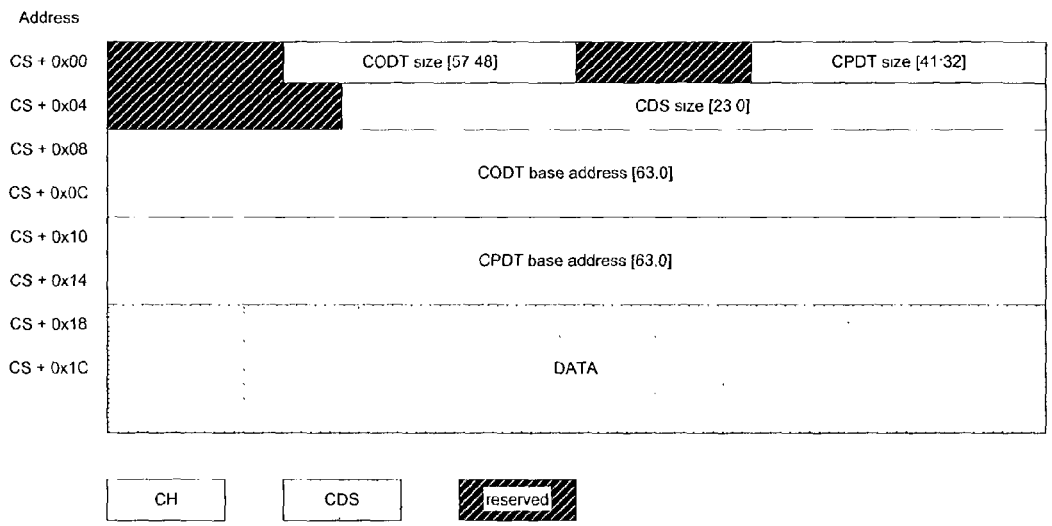
FIGURE 18. CLASS SPACE (CS)
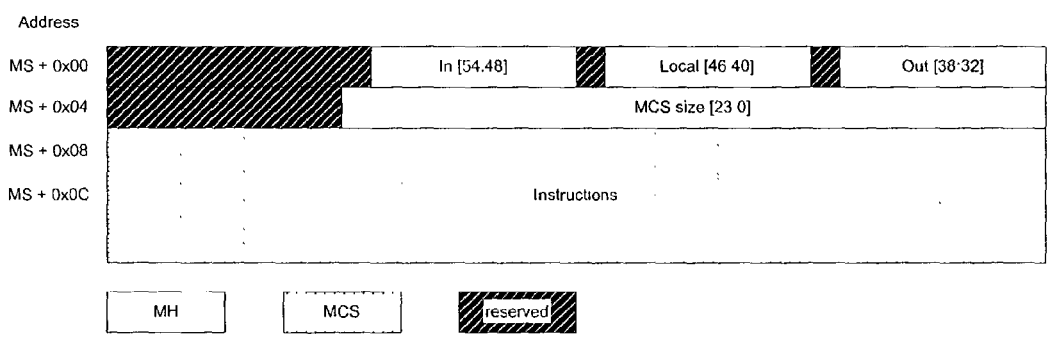
FIGURE 19. METHOD SPACE (MS)

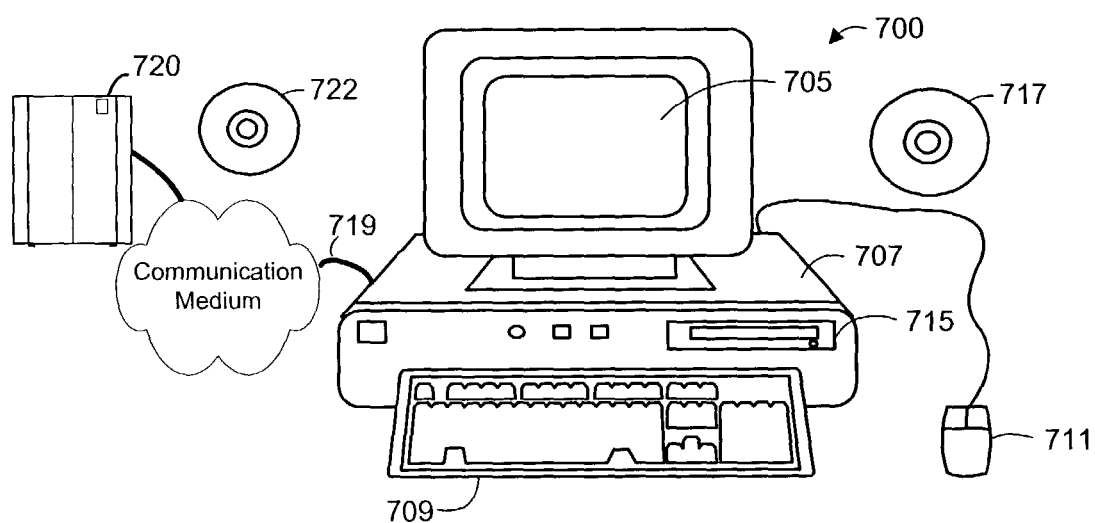
FIGURE 20. EXAMPLE INFORMATION PROCESSING SYSTEM

SECURE CONTROL TRANSFER IN INFORMATION SYSTEM

CROSS REFERENCE TO RELATED APPLICATIONS

This application is a continuation-in-part of patent application Ser. No. 10/198,617 filed 17 Jul. 2002, which claims benefit of priority from provisional application No. 60/306,480, filed on Jul. 18, 2001.

The above referenced documents and application and all documents referenced therein are incorporated in by reference for all purposes.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to digital processing. More specifically, the invention relates to a method and/or system and/or apparatus for providing secure control transfer in information processing methods and/or systems. In specific embodiments, the invention involves a method and/or system and/or apparatus providing secure control transfer in object oriented environments, though other applications will be apparent from the teachings herein. In further embodiments, the invention involves one or more methods that may be implemented on a data handling device or system, such as a computer or other information enabled device. In further embodiments, the invention involves methods and/or systems and/or apparatus for more efficient digital information handling in data environments designed for use and/or distribution over a communication network, such as, for example, Java.

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

As software applications become more sophisticated and complex, development of software is often partitioned into different modules. Modules are a collection of subroutines. Programs are partitioned into different subroutines. They require switching between one subroutine and another. The switching from one procedure to another is generally performed by control transfer instructions. In traditional CISC and RISC computers, control transfer can take place with a jump/branch instruction from one position to another of the addressing space. This generates a security issue. If a misbehaving procedure, such as a hacker program or a virus, is intentionally programmed to break into the security system of other programs that share its addressing space, the programs are unprotected and their integrity can be violated. This security hole creates opportunities for hackers and viruses and other malicious code.

Non-Sharing Processes

In current practice, in order to avoid interference, programs are normally executed as processes in different address spaces. By separating address space, different programs are generally invisible to one another. This solution generally provides security by using access control code in translation look aside buffer (TLB) and virtual memory. The solution is practical, but it introduces a large overhead of context switching that can have significant negative impact on performance. In a multiprogramming environment, many processes are running concurrently. The more processes running on the machine, the more overhead in the system due to context switching.

Object-Oriented Virtual System

Currently object-orientated programming (hereafter also referred as OOP) is often used to deal with the protection of subroutines. Object-oriented programming partitions a program into objects. In OOP, an object is a combination of a method (procedure code) and data. Methods are defined within objects as interfaces of communication. A method is an object-oriented version of subroutines. The calling of methods is named method invocation in object-oriented programming. In OOP, communication among objects in generally only performed by method invocation. In contrast with the subroutine calls in non-OOP system, method invocation provides a secure version of control transfer from one domain to the other. Because control transfer is secured in an OOP system, multiprogramming can be achieved by the use of threads instead of processes. In contrast with the process, a thread shares address space with other threads, which means the overhead of context switching between processes can be avoided.

OOP is currently adapted in software applications and operating systems. Though the software is designed with OOP, it still uses control-flow instructions such as jump/branch, which allow the branching from a point to another in the addressing space. These instructions leave security black holes in the level of instruction execution. Current hardware architectures are not designed to run object-oriented programs. The mapping of objects to machine instructions would introduce loss of features in OOP. One employed solution is to provide a virtual system for the running of object oriented (hereafter also referred as "OO") programs.

Java was introduced as an OOP language. Java programs run on a virtual system, named Java Virtual Machine (JVM). Java programs are translated into machine independent byte-codes before feeding into the JVM for execution. The use of virtual system over a real system (e.g., the underlying processor architecture and operation system, such as wintel) hides the lower layer of machine instructions.

A problem for JVM is its performance. A program running on a virtual system on top of a real system requires two levels of translation, while a program running directly on a real system can directly map program constructs into hardware instructions. The overhead introduced by the virtual system is thus generally a burden for JVM implementations. A program written in C++ that runs directly under Unix, for example, generally always executes faster than the same program written in Java that runs on a JVM.

OTHER REFERENCES

Various strategies have been discussed for improving OOP environments by more efficiently providing security and/or context switching, among them those discussed in the below indicated patents and other publications, some of which also provide general background information related to the present discussion.
[1] David Detlefs, Al Dosser, and Bejamin Zom. "Memory allocation costs in large C and C++ programs.". *Software—Practice and Experience*, pp. 527-542, June 1994.
[2] Brad Calder, dirk Grunwald, and Benjamin Zom, *Quantifying Behavioral Differences Between C and C++ Programs*, Technical Report CU-CS-698-95, Department of Computer Science, University of Colorado, Boulder, Colo., January 1995.
[3] M. Chang, Woo Hyong Lee, and Y. Hasan. "Measuring dynamic memory invocations in object-oriented programs". *IEEE International Computing and Communications Conference Performance* 1999, pp. 268-274. IEEE Computer Society Press, February 1999.
[4] J. M. Chang and E. F. Gehringer. "A high performance memory allocator for object-oriented systems". *IEEE Transactions on Computers*, volume 45, issue 3, pp. 357-366. IEEE Computer Society Press, March 1996.
[5] H. Cam, M. Abd-El-Barr, and S. M. Sait. "A high-performance hardware-efficient memory allocation technique and design". *International Conference on Computer Design,* 1999. (ICCD '99), pp. 274-276. IEEE Computer Society Press, October 1999.
[6] Richard C. L. Li, Anthony S. Fong, H. W. Chun, and C. H. Tam. "Dynamic Memory Allocation Behavior in Java Programs". *Proceedings of the ISCA 16th International Conference in Computers and Their Applications,* 2001. (CATA-2001), pp 362-365. The International Society for Computers and Their Applications—ISCA.

PATENT DOCUMENTS

[7] U.S. Pat. No. 5,930,829 July 1999 Frank S. Little
[8] U.S. Pat. No. 6,219,772 April 2001 Ashok Kumar Gadangi
[9] U.S. Pat. No. 6,295,594 September 2001 Stephan G. Meier
[10] U.S. Pat. No. 6,003,038
[11] International Publication Number: WO 02/48864 A2

SUMMARY OF THE INVENTION

The present invention according to specific embodiments provides for introducing Object-Oriented Programming (OOP) into hardware with an OOP processor provided at an architectural level. This allows software developed with OOP concept to be directly mapped into hardware. According to further specific embodiments of the invention, object security can be enforced not only in software, but also in hardware. An OOP processor according to specific embodiments of the invention performs security checks for objects, and eliminates most of the software work for access checking. Thus, according to further specific embodiments of the invention, the majority work of access control is done at compile time, rather than at run-time. This allows OOP programs to execute faster with an OOP processor by a large margin, as much as 10-to-1 or higher in specific implementations. Multi-threading technology is used in further embodiments to achieve multi-tasking. Performance can thus be enhanced with minimal context switching.

According to further embodiments of the invention OOP, the invention includes a hardware or hardware-like (e.g., firmware) facility for communication and access control, to compute instructions, with a mapping mechanism of access control for object-oriented computing, through operand descriptor tables to describe the access control based on the object-orientation requirements, such as private, public, package, or protected, etc. The tables are stored in hardware for performance. The hardware emulates an object-orientation environment, to provide object management, object-oriented memory management, etc.

According to further embodiments, the invention ensures security of different data structures in an object-oriented processor with register pairs (e.g., one containing the base address and the other the size of the data structure), protecting against out of bounds access of data structures. The invention provides continuous access control when passing information/data from memory/memory stacks into general registers for fast processing.

According to further specific embodiments, the present invention includes descriptors. These have some similarity to the operand descriptor of U.S. Pat. No. 6,292,879B1 by one of the inventors of this invention. According to specific embodiments of the present invention, these descriptors specify access control information, which is generally generated by compilers and the access privileges of which will be checked and maybe reduced or eliminated by operating systems or certain governing programs.

According to specific embodiments of the present invention, the invention excludes the use of pointers to eliminate illegal accesses between different modules for security purposes. With threading technology and hardware support, the invention is also able to provide a fast and efficient multi-tasking environment. Thus with this invention, the hardware emulates an object-orientation environment, to provide comprehensive, effective and efficient object management, object-oriented memory management, etc.

Software Implementations

Various embodiments of the present invention provide methods and/or systems for improved security and access control that can be implemented on a general purpose or special purpose information handling appliance using a suitable programming language such as Java, C++, C#, Cobol, C, Pascal, Fortran., PLI, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

All references, publications, patents, and patent applications cited herein are hereby incorporated by reference in their entirety for all purposes.

BRIEF DESCRIPTION OF THE DRAWINGS

FIG. 1 is a diagram illustrating a method for improved security and enhanced performance of the present invention.

FIG. 2 is a diagram illustrating a method for enhanced performance in multi-tasking environment of the present invention.

FIG. 3 is a diagram showing the contexts involved in different kinds of method invocation of the present invention.

FIG. 4 is a diagram of the definition of method states in Status Register of the present invention.

FIG. 5 is a diagram illustrating the major steps involved in method invocation of the present invention.

FIG. 6 is a diagram illustrating the major steps involved in method revocation of the present invention.

FIG. 7 is an example illustrating internal method invocation in Java and its corresponding data structure of the present invention.

FIG. 8 is an example illustrating class method invocation in Java and its corresponding data structure of the present invention.

FIG. 9 is an example illustrating instance method invocation in Java and its corresponding data structure of the present invention.

FIG. 10 is a diagram of the definition of Class Operand Descriptor format of the present invention.

FIG. 11 is a diagram of the definition of Class Property Descriptor format of the present invention.

FIG. 12 is a diagram of the definition of the Type field of the present invention.

FIG. 13 is a diagram of the definition of the Static Flag of the present invention.

FIG. 14 is a diagram of the definition of the Read Only Flag of the present invention.

FIG. 15 is a diagram of the definition of the Resolved Flag of the present invention.

FIG. 16 is a diagram of data structures relationship of the present invention.

FIG. 17 is a diagram of the definition of Instance Space of the present invention.

FIG. 18 is a diagram of the definition of Class Space of the present invention.

FIG. 19 is a diagram of the definition of Method Space of the present invention.

FIG. 20 is a block diagram showing a representative example logic device in which various aspects of the present invention may be embodied.

DETAILED DESCRIPTION OF SPECIFIC EMBODIMENT

Before describing the present invention in detail, it is to be understood that this invention is not limited to particular compositions or systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content and context clearly dictates otherwise. Thus, for example, reference to "a device" includes a combination of two or more such devices, and the like.

Unless defined otherwise, engineering and scientific terms used herein have meanings as commonly understood by one of ordinary skill in the art to which the invention pertains. Although any methods and materials similar or equivalent to those described herein can be used in practice or for testing of the present invention, the preferred materials and methods are described herein.

In describing and claiming the present invention, the terms storage, storage elements, storage devices, and memory are generally used interchangeably.

While the invention is susceptible to various configurations and alternative forms, specific embodiments are shown by way of example in the drawings and will be described in details. It should be understood that the drawings and detailed description are not intended to limit the invention to the particular form disclosed, but to cover all modifications, equivalents and alternatives failing within the spirit and scope of the present invention as defined by the appended claims.

An Example Embodiment

The following description presents the structure and operation of a processing system incorporating specific embodiments of the present invention. In specific embodiments, the invention may be understood as involving a processing system consisting of a processor and an operating system. The processing system is capable of providing a secure control transfer mechanism from one domain to another, to enhance both the security and performance over unprotected control transfer system. In further embodiments, the invention may also involve one or more compilers or modifications to compilers to take advantage of a processor according to specific embodiments of the present invention.

Improved Security and Enhanced Performance

To provide a secure control transfer mechanism in the system, object-oriented programming is used. A secure control transfer system uses an object-oriented processor, which provides object-oriented concept mappings at processor instruction level. In an object-oriented system, control transfer only takes place in method invocation and method revocation. The object-oriented processor provides a secure mechanism that allows only guarded branching within the method space. It limits the communication of objects through methods.

In further embodiments, compilers according to the invention construct various data structures for access control. The mapping depends on the access requirements of object-oriented programming, such as public, private, protected, etc.

The object oriented processor uses these mappings to execute processes of both object-oriented and non object-oriented programming.

At any instance of an object-oriented platform, the system performs execution in one of the methods. Inside a method, it can transfer the control of the system to another method through invocation. After the invoked method finishes, it returns control with revocation. Thus, an object-oriented processor according to specific embodiments of the present invention eases method communication at instruction level by providing certain mappings of object-oriented concepts and a fast and secure mechanism in control transfer. Therefore, security of objects is ensured at instruction level.

FIG. 1 illustrates a method for improved security and enhanced performance of the present invention. With these object feature mappings, an object-oriented platform built on an object-oriented processor requires less translation steps from software to hardware. Therefore an object-oriented processor is more efficient than a traditional processor for OOP execution.

FIG. 2 illustrates a method for enhanced performance in multi-tasking environment of the present invention. In multi-tasking environment, threading technology is used to enhance the performance of the system. Threads, which are light-weighted processes, share the addressing space of the system with one another. A shared addressing space requires no overhead of process swapping. Therefore, the performance in a multi-tasking environment is further enhanced.

Secure Control Transfer Mechanism

A secure control transfer mechanism is provided in the object-oriented processor according to specific embodiments of the invention. In the object-oriented processor, an instruction invoke is defined for invoking a method, and an instruction revoke is defined for revoking from a method. The instruction, invoke, takes operands that specify the data structures representing the invoking method.

Method invocation can be generally divided into three categories: internal method invocation, class method invocation, and instance method invocation. There is generally a corresponding context on each individual method. An internal method invocation only requires switching of the method context. A class method invocation requires one more context, the class context, in addition to the corresponding method context. The instance method invocation requires switching of the three contexts: method, class context, and instance. The more the context switches, the more the information needs to push to the System Stack. FIG. 3 provides and illustration of context involved in method invocation On method invocation, the processor pushes information about the current states in the machine to the system stack. There are some differences for information pushed to the stack because of the different contexts involved in switching. The context involved for different kind of method invocation is shown in FIG. 3. At the same time, the object-oriented processor reads through the data structures to update the state of the processor. By locating the method code starting address, the processor transfers the control to the invoked method.

In order to manage the invocation states in hardware, two bits are used in the Status Register (SR) to store which type of method invoking is currently running in the machine. FIG. 4 illustrates example definitions for these two bits.

FIG. 5 illustrates the major steps involved in method invocation. The Variable Stack stores the local variables and passing parameters, while the System Stack stores the context information history for each method invocation. Different context information is stored in the System Stack according to the type of method invocation.

FIG. 6 illustrates the major steps involved in method revocation. Thus, according to specific embodiments of the present invention, when a method finishes its execution, there will always be a revoke instruction to return the executing context from the current context to the caller (invoke) context. A revoke instruction operates as the complement of the invoke instruction. It restores the previous context by popping the previously stored information to the context registers. Since there are three types of method invocation in the said processor, there are differences in the revocation among the different types. To distinguish which type of method invocation is currently running in the context, the processor simply looks up the Status Register (SR) in the machine. Two bits are stored to distinguish the context types involved in the current method invocation. Basing on the SR, the context is restored.

Variable Stack is defined for storage of local variables and parameters, while System Stack stores the information of the past contexts for each method invocation. Variable Stack and System Stack are implementation dependent. They can be located in registers, memory, and/or other storage devices. Different context information is stored in System Stack according to the type of method invocation.

FIG. 7 shows an example of internal method invocation in Java and its corresponding data structures in a processor according to specific embodiments of the present invention. When the ivk DoSomething( ) instruction is executed (ivk is an instruction according to specific embodiments of the present invention to perform method invocation, and DoSomething( ) represents the name of a method without parameters), it triggers the internal method invocation. For internal method invocation, the system directly accesses the CPDT for locating the invoked method. In the example, the instruction specifies the invoked method with the method reference DoSomething. The method reference DoSomething provides a direct address inside the current class context's CDS (Class Data Space) to locate the MS (Method Space) of public void DoSomething( ). With the information in MS, a processor according to specific embodiments of the present invention saves the current context and switches to the invoked method context. Instruction execution resumes in the invoked method public void DoSomething( ) if no violation occurs in the invocation process.

FIG. 8 shows an example of class method invocation in Java and its corresponding data structures in a processor according to specific embodiments of the present invention. When the ivk Apple.About_Apple( ) instruction is executed, it triggers the class method invocation. In the example, the instruction specifies the invoked method with the field reference About_Apple. The field reference About_Apple provides two offsets. One offset, Class, locates the target class reference Apple. The direct address of Class Apple inside current CDS is used to locate the invoked class context. The other offset, Property, locates the method reference About_Apple inside the invoked class' CPDT. A direct address inside the invoked class context's CDS is used to locate the MS of public static void About_Apple( ). With the information in invoked contexts, the processor saves and updates both the class and method contexts. Instruction execution resumes in the invoked method public static void About_Apple( ) if no violation occurs in the invocation process.

FIG. 9 shows an example of instance method invocation in Java and its corresponding data structures in a processor according to specific embodiments of the present invention. When the ivk orange.eat( ) instruction is executed, it triggers the instance method invocation. In this example, the instruction specifies the invoked method with instance reference orange and field reference eat. The instance reference orange points to the IH (Instance Header) of the invoked context. The field reference eat provides two offsets. One offset, Class, locates the target class reference Orange. The direct address of Class Orange inside current CDS is used to locate the invoked class context. A checking is performed to see whether the CH (Class Header) pointed by invoked instance is the same as Class Orange. For difference in comparison, exception would be thrown in order to resolve the requested reference again. The other offset, Property, locates the method reference eat inside the invoked class's CPDT. A direct address inside the invoked class context's CDS is used to locate the MS of public void eat( ). With the information inside invoked contexts, the processor saves and updates both the class and method contexts. Instruction execution resumes in the invoked method public void eat( ) if no violation occurs in the invocation process.

Object-Oriented Mapping

According to specific embodiments of the present invention, an object-oriented processor provides object features mapping at the instruction level. A set of object-oriented machine or architecture instructions are defined. These instructions are capable of reading data structures that are defined for representing different object structures. In object-oriented programming, there are three contexts representing the states of an object-oriented platform. These three contexts are instance, class, and method contexts.

The processor maintains a set of registers for specifying the states of the system. These registers locate the data structures of the three context types. Among other implementations, they can typically be provided as register-pairs, where a base register stores the direct address to the data structures, and a size register stores the size of the data structure. Instructions that access the data structures are validated with out-of-bound checking before actual computation. Any violation will trigger a protection violation fault. This ensures the security of different data structures in the system.

Three headers are defined in the architecture. They are instance, class, and method headers. These headers provide mapping to its related context. Information of the context is stored directly, or indirectly through the header. A header may associate with some other structures for different aspects of the context.

Descriptor tables store a set of descriptors. These descriptors contain information about the elements of the context. There are two types of descriptor tables defined in the architecture. They are the Class Operand Descriptor Table (CODT), and the Class Property Descriptor Table (CPDT). The name of the descriptor table identifies CODT and CPDT to represent information of the class context.

The definition of Class Operand Descriptor (COD) and Class Property Descriptor (CPD) are implementation dependent. FIGS. 10 and 11 show one set of the definitions. Different fields are defined for describing the data, including Address Field, Type Field, Static Flag, Read Only Flag and Resolved Flag. The address field stores a byte offset to locate the data. The type field stores the type of data. The static flag shows whether the describing entry is static or not. The read only flag sets the data to read only access if it is so. The resolved flag shows whether the entry is resolved or not. FIGS. 12, 13, 14 and 15 shows the definition for each field.

Besides descriptor tables, there are data spaces for the storage of data. There are three types of data space defined according to specific embodiments of present invention. They are the Class Data Space (CDS), the Instance Data Space (IDS) and the Local Variable Frame (LVF). Unlike CDS and IDS, LVF are dynamically created inside the variable stack upon method invocation and destroyed upon method revocation. For multi-threading support, Thread State Space (TSS) is defined for storing the states of a thread. TSS only presents in thread instances and it is not a necessary for instance context mapping.

Inside the method context, there is Method Code Space (MCS). MCS stores the instructions for the method. FIG. 16 shows the relationships between different individual data structures.

The instance context in the architecture contains two components. They are the Instance Header (IH) and the Instance Data Space (IDS). Each object instance on the system maintains its own IH and IDS. For the recognition of an instance in the architecture, Instance Space (IS) is defined.

IH is a reference to locate an object instance. Inside the IH, it contains a pointer to the Class Header (CH) of the object instance's type. Another pointer is maintained to locate the IDS. For thread instances, a pointer is maintained to locate TTS.

IDS is defined for the storage of instance variables. IDS should be word-aligned, otherwise, unexpected result will occur.

The architecture defines IS for the representation of instance on the system. IS is a data structure, which packs IH and IDS to form a data structure that is known to hardware. IDS is defined for the storage of instance variables. It is variable in size with the size specified in IH. TSS stores information of thread state. An instance can be declared as a thread. TSS is a fixed size data structure. It provides some storage for pointers locating the thread stack. Base, current, and limit addresses of stack are stored. Besides, the structure provides spaces for register file storage.

IS is the hardware readable structure for instance context. The definition of IS is implementation dependent. FIG. 17 shows one of the implementation. It packs IH and IDS into a single entity. The base address of IDS is not stored since it is bind to address IS+0x018. The size of IDS is stored as 24-bit unsigned number, representing size in byte. It gives a maximum size of $2^{24}$ bytes for IDS. A direct address for locating TSS is stored. Every instance associates with a certain class type on the system. Inside the IH, there is a direct addressing pointing to the CH structure of the type.

Every object in the OOP system belongs to a class type. A class type is a template for generating objects in the same kind. To map the class context in our architecture, four components are defined. This includes the Class Header (CH), the Class Operand Descriptor Table (CODT), the Class Property Descriptor Table (CPDT), and the Class Data Space (CDS). Each class type maintains their information with these components. For the recognition of these components in hardware, Class Space (CS) is defined.

To locate a class in the system, the CH is used. It provides information about the class directly inside the header, or indirectly through other data structures. The CH maintains pointers to CODT and CPDT. Besides, another pointer is stored to locate the CDS.

CODT is a table, which stores Class Operand Descriptors (CODs). A COD inside the CODT represents a single resource that the class would access. The resource can be a constant, or a reference. Instructions should reference the CODT in order to access these resources. Upon class loading, all the reference COD would be marked as unresolved. The reference CODs would generally be resolved upon request. Only two reference types are legal for a COD entry. The types include, Class Reference, and Property Reference. A class reference COD represents a class that could be accessed within the current class context. A property reference COD represents a property that could be accessed within the current class context. For class reference, a 64-bit direct address is stored inside CDS to locate the accessible class's CH. For property reference, two 10-bit offsets are stored in CDS. One offset, from bit 0-9, specifies another class reference COD in the same CODT. It shows the target class of the property. The other offset, from bit 16-25, specifies the property in the CPDT of the target class.

Constants can only be primitive-typed data. There are altogether six types of constants. They are the byte, halfword, word, doubleword, float, and double constants. Instructions are defined to generate these constants.

Similar to CODT, CPDT is a table, which stores Class Property Descriptors (CPD). Every CPD in CPDT represents a single property owned by this class. The CPD provides information to locate these properties. A property in class can be a method, instance variables, or class variables.

The CPD contains information for access control validation. It includes the Static Flag and the Read Only Flag. The Static flag indicates which data spaces the data is stored. Three types of data field are defined in the said processor. They are non-static field, static field, and inherited static field.

For non-static field, the data is stored inside Instance Data Space (IDS) of the target reference. For static field, it is stored inside Class Data Space (CDS) of the target reference. The inherited static field is different. It occurs when a static field is inherited on class extension. A direct address is stored inside the CDS which points to the data directly.

The Read Only Flag shows the describing data is a constant, i.e. read only. If it is reset, the data is for read only. Otherwise the data is allowed for both read and write, and any violation will trigger a protection violation.

A method CPD represents a method defined in this class. A direct address is stored in CDS in order to locate the MH representing the method.

A field can be declared as static, or non-static. A field CPD represents a field declared in this class. The Address Field provides a byte offset to locate the data in either CDS, or IDS, depends on the Static Flag. If the field were static, the data would be in CDS, otherwise IDS. CDS is defined for the storage of class variables and constants. It is variable in size with the size specified in CH.

The hardware readable format of class context is named CS. It is implementation dependent. FIG. 18 shows one of the implementations. It packs CH and CDS to form a single entity. The base address of CDS is not stored since CDS is packed to follow CH. The base address of CDS is CS+0x018 (0x denotes hexadecimal numbering). The size of CDS is stored. It defines as a 24-bit number, representing the size in byte for CDS. The architecture allows a maximum of $2^{24}$ bytes of CDS. The size of CODT and CPDT are stored as 10-bit numbers, representing the number of descriptor entries in both descriptor tables. Besides, two direct addresses are stored to point to the base of CODT and CPDT.

In a class definition, methods are defined for the operations of this class. The architecture provides the mapping of method context by Method Space (MS). MS is a hardware recognizable data structure that stores information about a method. Method Header (MH), Method Code Space (MCS), and Local Variable Frame (LVF) are defined for storing information of method in different aspect. Every method in the system associates with a MH. Just as the usage of other headers, MH represents method and describes the information of methods. It stores a pointer to locate MCS. Besides, it stores the size of LVF that the processor needs to allocate on method invocation.

MCS stores instructions. It is variable in size and the size is specified in MH. This is the only data structure that stores instructions in the system.

LVF is defined for the storage of local variables and parameters. Unlike the data spaces, LVF is dynamically created upon method invocation, and removed upon method revocation. LVF can be divided into three regions, in, local and out region. The out region of the current LVF overlaps with the in region of invoked method's LVF. This scheme eases parameter passing.

MS is a hardware-readable format of method context. It is implementation dependent. FIG. 19 shows one of the implementation. It packs MH and MCS to a single entity. The base address of MCS is MS+0x008. A 24-bit unsigned number is stored for representing the size of MCS. Besides, in order to specify the size of LVF, three 7-bit unsigned numbers are stored. They specify the number of registers needed to allocate for each region in LVF.

The system allocates different distinct individual storage spaces for individual components of individual objects. These spaces do not overlap one another. Compilers in the system construct the above tables and their entries. During execution of the processes (programs), the tables and their entries will be loaded into individual caches. The tables and their entries may be updated during execution of the processes when needed.

Embodiment in a Programmed Information Appliance

FIG. 20 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 20 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

Other Embodiments

The invention has now been described with reference to specific embodiments. Other embodiments will be apparent to those of skill in the art. In particular, a digital information appliance has generally been illustrated as a personal computer. However, the digital computing device is meant to be any information processing appliance and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein or filed with this application, including any references filed as part of an Information Disclosure Statement, are incorporated by reference in their entirety.

What is claimed is:

1. An information handling system providing secure control transfer comprising:
   a processor providing object-oriented programming support at an architectural level;
   an instruction set of said processor providing architecture level support for object-oriented process execution by utilizing a set of hardware readable data structures that represent different object structures, wherein the hardware readable data structures comprises (a) an instance space for instance context mapping, (b) a class space for class context mapping, and (c) a method space for method context mapping such that an invoke or revoke instructions utilizes said hardware readable data structures in order to securely switch context; and
   an operating system providing secure control transfer between objects utilizing said instruction set.

2. The system of claim 1 further comprising:
   wherein said operating system is able to use threading technology with shared address space to provide multi-tasking; and
   further wherein said threading technology is protected by secure control transfer supported by said processor.

3. An object oriented processor system providing secure control transfer from one method to another comprising:
   a processor;
   an instruction set that provides architecture level support for the object oriented processor system by utilizing a set of hardware readable data structures that represent different object structures, wherein the hardware readable data structures comprises (a) an instance space for instance context mapping, (b) a class space for class context mapping, and (c) a method space for method context mapping such that an invoke or revoke instructions utilizes said hardware readable data structures in order to securely switch context;
   a status register;
   a system stack;
   a variable stack;
   wherein said instruction set provides no direct address control transfer;
   wherein said instruction set provides control transfer between methods with said invoke and revoke instructions;
   wherein method locations are specified by a hardware readable data structure describing the method;
   wherein said status register stores the current states of method invoking for determining the context involved in method invocation and revocation;
   wherein said system stack stores the history context information; and
   wherein said variable stack stores the local variables of methods.

4. The system of claim 3 further wherein:
   said system supports various types of method invocation, said types comprising internal method invocation, class method invocation, and instance method invocation;
   wherein said internal method invocation requires switching of method context;
   wherein said class method invocation requires switching of class and method contexts; and
   wherein said instance method invocation requires switching of instance, class and method contexts.

5. The system of claim 3 further wherein:
   said invoke instruction saves context information in said system stack, where context information involved is determined by type of invocation; and
   wherein said revoke instruction restores context information from said system stack, where context information involved is determined by said status register.

6. The object-oriented processor of claim 3 further comprising;
   wherein said invoke instruction allocates space, where size of space is specified in a data structure representing a method and for local variables of method in said variable stack; and
   wherein said revoke instruction deallocates current spaces for local variables in said variable stack.

7. A processing system providing secure control transfer comprising:
   at least one processors;
   at least one memory modules;
   a plurality of caches;
   an operating system;
   at least one compiler;
   wherein said compiler construct various tables for access control, and mapping depending on access requirement for object-oriented programming, to be used by the processor when executing process of both object-oriented and non-object-oriented programming;
   wherein said processor provides object-oriented programming support at hardware level through an object-oriented supported instruction set that utilizes a set of hardware readable data structures that represent different object structures, wherein the hardware readable data structures comprises (a) an instance space for instance context mapping, (b) a class space for class context mapping, and (c) a method space for method context mapping such that an invoke or revoke instructions utilizes said hardware readable data structures in order to securely switch context;

wherein said processor provides object concepts mapping to said operating system for providing an object oriented system platform via said hardware readable data structures;

wherein said operating system provides secure control transfer between objects with object-oriented programming support in said processor via said invoke and revoke instructions.

8. The system of claim 7 further comprising:
a method for providing an efficient and secure multi-tasking platform with said secure control transfer system, the method comprising;
   using threading technology (sharing of addressing space) instead of process technology (non-sharing of addressing space) to provide multi-tasking environment;
   wherein said threading technology is protected by said secure control transfer supported by processor; and
   wherein said threading technology eliminates large overhead caused by process swapping to give better efficiency.

9. An object-oriented processor providing secure control transfer from one method to the other, the object-oriented processor comprising:
   a processor;
   an instruction set that provides architecture level support for the object oriented processor system by utilizing a set of hardware readable data structures that represent different object structures, wherein the hardware readable data structures comprises (a) an instance code space for instance context mapping, (b) a class code space for class context mapping, and (c) a method code space for method context mapping such that an invoke or revoke instructions utilizes said hardware readable data structures in order to securely switch context;
   a status register;
   a system stack;
   a variable stack;
   wherein said instruction set provides no direct pointer data access;
   wherein said instruction set provides no direct address control transfer;
   wherein said instruction set is only valid inside method code space;
   wherein said instruction set provides control transfer between methods with said invoke and revoke instructions, and the location of the method is determined by a hardware readable data structure describing the method;
   wherein said status register stores the current state of the invoking method for determining the context involved in method invocation and revocation;
   wherein said system stack stores the history context information;
   wherein said variable stack stores local variables and parameters of methods;
   wherein said system stack and said variable stack are stack and implementation dependent.

10. The processor of claim 9 further comprising;
   supporting various types of method invocation, including internal method invocation, class method invocation, and instance method invocation;
   wherein said internal method invocation provides a fast switching among same class or instance;
   wherein said internal method invocation requiring switching of method context only;
   wherein said class method invocation requiring switching of class, and method contexts; and
   wherein said instance method invocation requiring switching of instance, class and method contexts.

11. The processor of claim 9 further wherein:
   said invoke instruction saves context information, where context information involved is determined by type of invocation, in said system stack;
   said invoke instruction provides only one entry point for a specific method; and
   said revoke instruction restores context information, where context information involved is determined by said status register, in said system stack.

12. The processor of claim 9 further wherein:
   said invoke instruction allocates spaces, where the size of space is specified in data structure representing the method, for local variables of method in said variable stack; and
   said revoke instruction deallocates current spaces for local variables in said variable stack.

13. A processor system providing thread concepts mapping and threading support at architectural level comprising:
   a processor;
   state registers;
   thread state registers;
   thread manipulation instructions that provides architecture level support for the object oriented processor system by utilizing a set of hardware readable data structures that represent different object structures, wherein the hardware readable data structures comprises (a) an instance code space for instance context mapping, (b) a class code space for class context mapping, and (c) a method code space for method context mapping such that an invoke or revoke instructions utilizes said hardware readable data structures in order to securely switch context;
   wherein said spaces are located at an instance header;
   wherein said spaces accessible by thread instances;
   wherein said spaces provide sub-spaces for storing processor states of a thread;
   wherein said state registers store the current states of processor;
   wherein said invoke instruction provides for saving of the current thread states in said sub-space; and
   said revoke instructions provides a restoring of previously saved thread states from said sub-space to state registers.

* * * * *